United States Patent [19]

Imler et al.

[11] Patent Number: 5,395,150
[45] Date of Patent: Mar. 7, 1995

[54] LOADER BASKET ASSEMBLY FOR TIRE PRESS

[75] Inventors: Donald C. Imler, Volant, Pa.; Dirk A. Keller, Salem; Jack Reed, East Palestine, both of Ohio

[73] Assignee: National Feedscrew & Machining Ind., Inc., Massillon, Ohio

[21] Appl. No.: 145,800

[22] Filed: Oct. 29, 1993

[51] Int. Cl.⁶ .............................................. B66C 1/54
[52] U.S. Cl. ........................................ 294/88; 294/93; 425/38
[58] Field of Search ................... 294/67.33, 88, 93–97, 294/119.1; 269/32, 34, 104, 107, 109, 152, 153, 164, 165, 218; 279/110, 118; 425/36, 38

[56] References Cited

U.S. PATENT DOCUMENTS

| | | | |
|---|---|---|---|
| 2,642,307 | 6/1953 | Olson | 294/67.33 |
| 3,380,115 | 4/1968 | Soderquist . | |
| 3,393,807 | 7/1968 | Sylvester et al. | 294/93 X |
| 3,564,649 | 2/1971 | Soderquist . | |
| 4,190,406 | 2/1980 | Geck et al. | 294/93 X |
| 4,279,438 | 7/1981 | Singh . | |
| 4,338,069 | 7/1982 | Singh et al. | 425/38 |
| 4,452,577 | 6/1984 | Irie | 425/38 |
| 4,472,125 | 9/1984 | Kubo et al. | 294/93 X |
| 4,608,219 | 8/1986 | Singh et al. . | |
| 4,618,320 | 10/1986 | Singh . | |
| 4,725,212 | 2/1988 | Singh . | |

Primary Examiner—Johnny D. Cherry
Attorney, Agent, or Firm—Rankin, Hill, Lewis & Clark

[57] ABSTRACT

A tire loader basket assembly for a tire press includes a frame; a plurality of loader shoes mounted for radial movement on the frame; an adjusting plate mounted for rotation with respect to the frame and connected to each of the shoes by a respective link such that rotation of the adjusting plate causes radial movement of the shoes; an actuating plate mounted for rotation with respect to the frame by operation of an actuating means connected to the actuating plate; and means for releasably connecting the adjusting and actuating plates together so that when the plates are connected, they rotate together by operation of the actuating means, and when the plates are unconnected, the adjusting plate can be rotated to set a movement limit for the shoes.

22 Claims, 2 Drawing Sheets

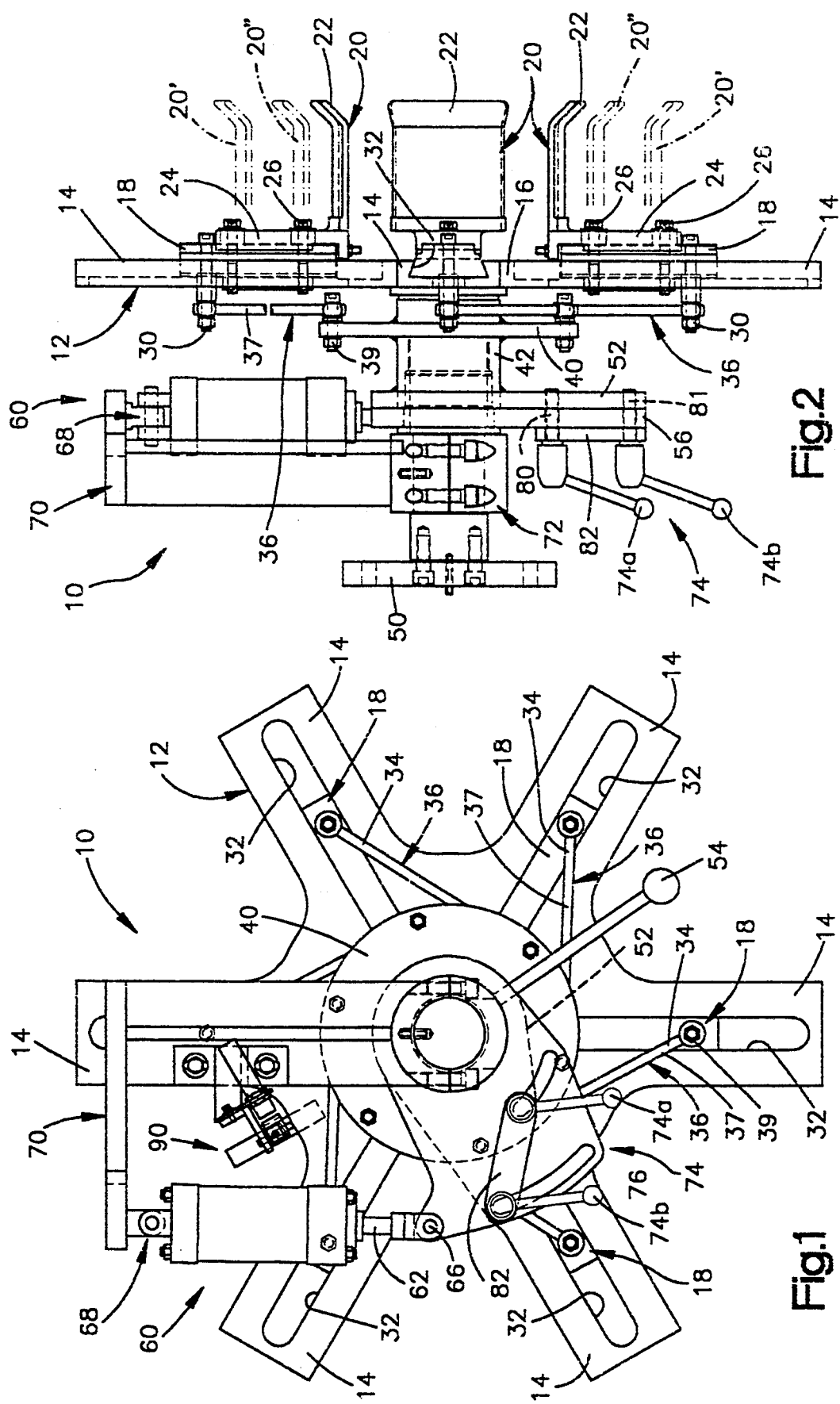

LOADER BASKET ASSEMBLY FOR TIRE PRESS

BACKGROUND OF THE INVENTION

The invention relates generally to tire loader apparatus, and more particularly to mechanisms for controlling the movement and positioning of loader shoes used with such apparatus.

Tire loaders are well known in connection with automated tire machinery such as tire presses. A tire loader is typically used to pick up a green or uncured tire and to position the green tire in a tire mold that is part of a tire press. A tire loader includes a loader basket having loader shoes that are used to hold each green tire, usually by exerting a slight pressure against the tire bead. This is accomplished by sliding or extending the shoes out horizontally to a position where they can engage the bead. After the green tire has been grabbed by the shoes, the loader is moved (typically in the vertical and horizontal directions) by an elevator frame to a position near the tire press mold such that the green tire is centered in the mold cavity. The shoes are then retracted so that the green tire drops into the mold cavity. The loader is then moved back to its original position for retrieving another green tire while the tire in the press is cured. In a double tire process, two tire loader baskets are used to load two green tires in to the press during each transfer operation. An important feature of the tire loader basket design is the control mechanism used to move and position the loader shoes.

An example of a tire loader basket of the prior art is disclosed in U.S. Pat. No. 4,279,438 (the '438 patent) issued to Singh. In the '438 patent, the movement and positioning of the loader shoes is accomplished using a stationary horizontal support plate and a rotatable horizontal circular plate, with the latter being connected to the shoes by means of respective connecting rods or links. The shoes move radially by a sliding action on a corresponding number of horizontal slide bars when the circular plate is rotated. The circular plate is rotated in an oscillatory fashion by use of a piston cylinder having at one end a rod that is connected to the circular plate. The blind end of the cylinder is mounted on the support plate. The stroke of the cylinder rod thus determines how far the circular plate is rotated which in turn determines how far the shoes extend radially outward.

An important aspect of the control mechanism for moving and positioning the shoes is the ability to adjust the travel or radial extension of the shoes on the slide bars. This is needed because a typical loader basket is used to pick up tires of various diameters, so that the radial extension of the shoes must be adjusted for the particular diameter of the tire to be picked up. In the '438 patent the travel distance of the shoes is adjusted by means of a stroke limiting assembly. This assembly physically restricts the stroke of the piston cylinder to a preset amount by manual use of adjustable stroke limiting lock nuts.

Using the stroke limiting assembly described in the '438 patent, the extended position of the shoes can be set only by adjustment of the limit stops. This is because the loader shoe linkage mechanism is always connected to the piston cylinder via the rotatable circular plate. It would be difficult and impractical to move the shoes against the resistance of the cylinder. Therefore, the stroke limiting assembly must be separately calibrated so that the stops can be accurately positioned by the operator depending on the diameter of the tires to be picked up. The use of the mechanical stops also results in the piston cylinder not being used for its full stroke in most cases.

The objectives exist, therefore, for a tire loader shoe adjustment mechanism that can be more quickly and easily operated for accurate setting of the extended position of the loader shoes.

SUMMARY OF THE INVENTION

The present invention provides improvements in the design of loader basket assemblies over such assemblies found in the prior art. In particular, the present invention allows the user quickly and easily set the desired engagement position of the loader shoes by the actuation of a few lever arms attached to the loader basket. The extended or engaging position of the loader shoes can thus be set automatically without the need to change the position of an adjustable stop or other similar mechanism. Furthermore, the piston can be used for its full stroke to advance and retract the loader shoes, and the action of the piston is not limited by the presence of a stop mechanism.

To the accomplishment of the foregoing ends, the invention contemplates in one embodiment a tire loader basket assembly for a tire press including a circular frame; a plurality of loader shoes each mounted on the frame for radial movement between an extended position and a retracted position; an actuation plate rotatable between first and second positions that correspond to the shoe extended and retracted positions; and an adjustment plate interconnected to each of the shoes and that can be connected for rotation with the actuation plate to cause the shoe radial movement, and that when unconnected from the actuation plate can be rotated to determine the extended positions of the shoes.

These and other aspects and advantages of the present invention will be readily understood and appreciated by those skilled in the art from the following detailed description of the preferred embodiments with the best mode contemplated for practicing the invention in view of the accompanying drawings.

BRIEF DESCRIPTION OF THE DRAWINGS

FIG. 1 is a top plan view of a tire loader basket assembly according to the present invention;

FIG. 2 is a side elevation of the tire loader basket assembly shown in FIG. 1;

DETAILED DESCRIPTION OF THE INVENTION

Figure 4:
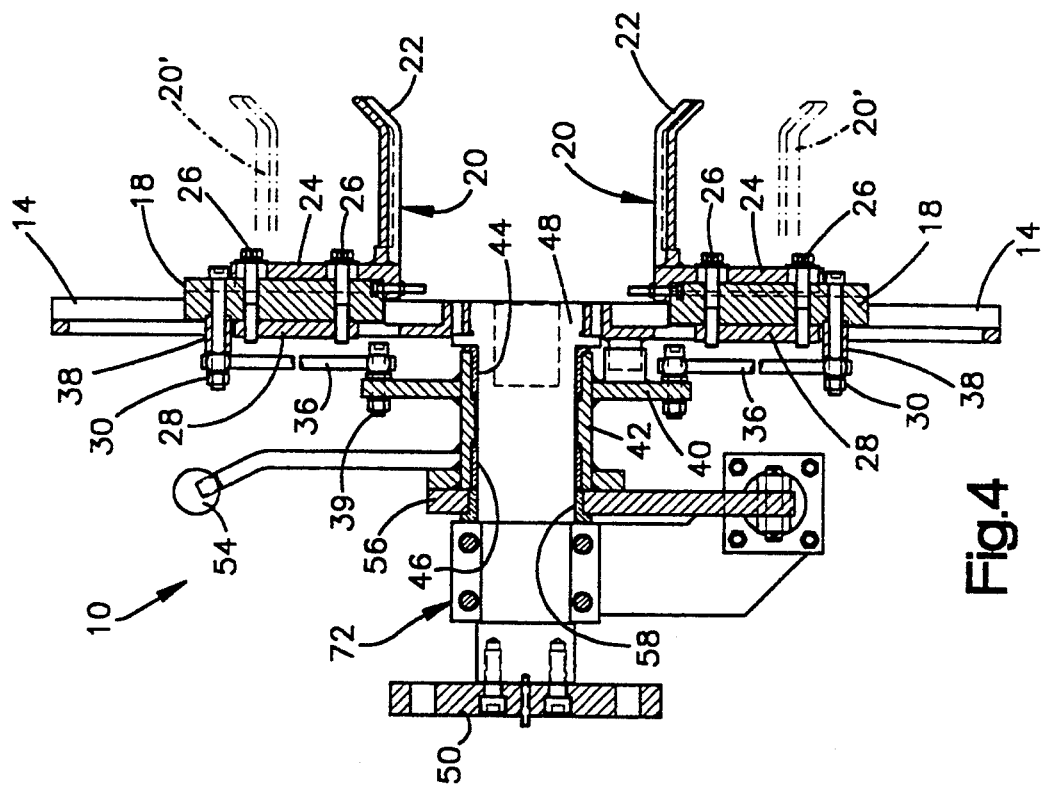
FIG. 4 is an opposite side elevation of the tire loader basket assembly of FIG. 1.

With reference to the drawings, an embodiment of a tire loader basket assembly in accordance with the present invention is generally designated with the numeral 10. Some features of the tire loader basket assembly 10 are similar to the loader baskets well known in the prior art and need not be described herein in detail. To the extent that certain features of the embodiment described herein differ from the design of prior art loader baskets and specifically relate to practicing the present invention, such features will be described herein. The present invention is directed primarily to a mechanism for adjusting the travel distance of the loader basket shoes used with such a tire loader apparatus.

The tire loader basket 10 includes a circular frame or spider 12 that has a plurality (in this case six) of radially extending horizontal slide bars 14 that are equidistantly spaced about the body 16 of the frame 12. A slide block 18 is mounted using a dovetail arrangement (FIG. 2) in a corresponding slotted opening 32 in each of the slide bars 14. Each of the slide blocks 18 carries a respective loader shoe 20. Each shoe 20 includes a vertically extending spine which is slightly curved at the bottom as at 22. The curved portion 22 is used to engage the bead of a green tire (not shown) such that the shoes can support the green tire while the loader is moved to the tire press mold. All of the shoe and slide block configurations preferably are the same.

Each slide block 18 is a self-aligning structure made of an elastomeric material such as phenolic resin that has lubricating properties. In the drawings of the present application, the slide blocks 18 are shown in a retracted position, although the shoes are shown in both a retracted position 20 and an extended position 20', the latter being shown in phantom.

Each shoe 20 is attached at an upper end to a shoe mounting plate 24. Each mounting plate 24 is attached to its respective slide block 18 by means of fasteners 26 that threadably engage a slide block bracket plate 28. A connecting link post 30 extends vertically from each slide block 18 through the slotted opening 32 in each respective slide bar 14. The top end of each link post 30 has a distal end 34 of a connecting link 36 pivotally attached thereto. Preferably, a bushing 38 is provided to support each link distal end 34 so that each link can pivot freely about its post 30.

Figure 3:
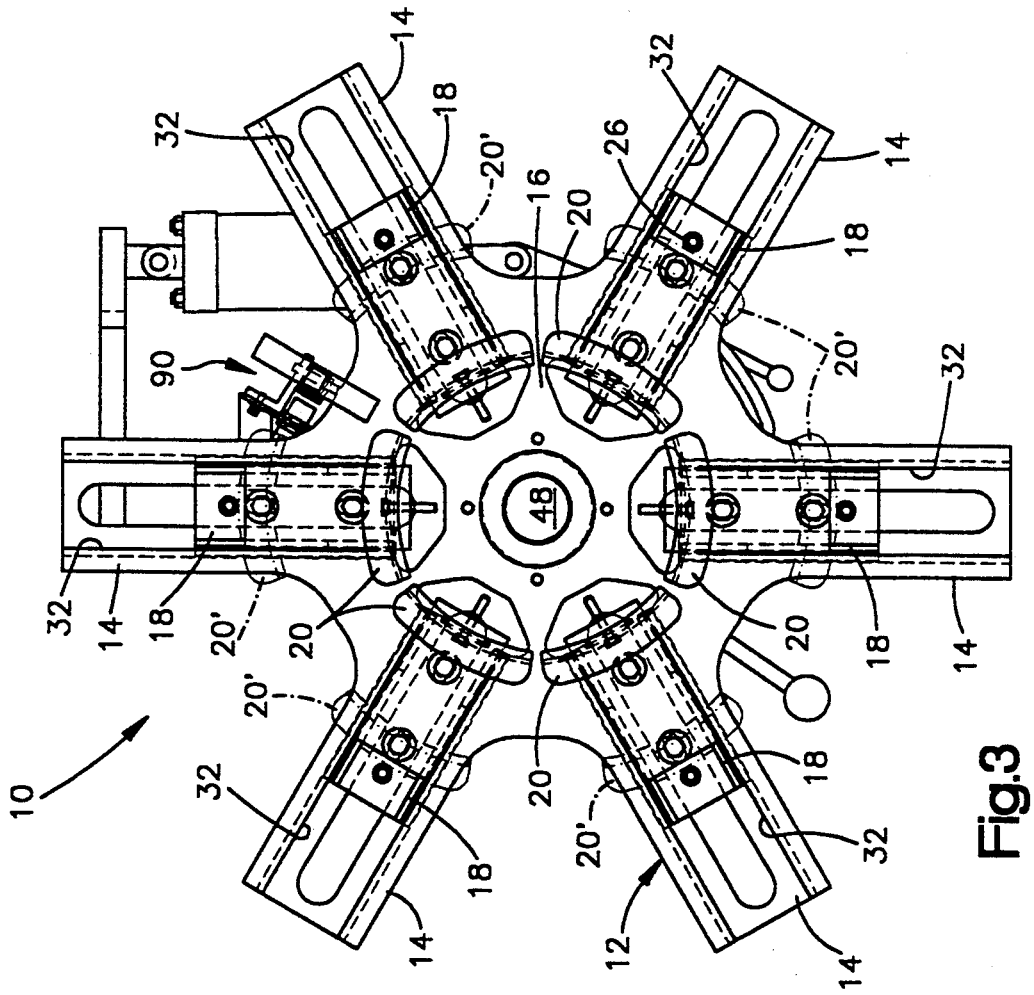
FIG. 3 is a bottom plan view of the tire loader basket assembly of FIG. 1.

As best illustrated in FIGS. 1 and 2, each connecting link 36 is used to connect a respective one of the slide blocks 18 to a circular plate 40 such that when the circular plate 40 is rotated (by means that will be described hereinafter), the blocks 18 move in a sliding action along the slide bars 14. Each connecting link 36 is pivotally connected at one end of a shank 37 to the circular plate 40 as by a bolt and nut assembly 39. In this arrangement, the slide blocks 18, and hence the loader shoes 20 carried therewith, can be moved to a radially extended position (when the circular plate is rotated counterclockwise as viewed in FIG. 1) as shown at the position 20' in FIGS. 2, 3 and 4, so that the shoes can engage the bead of a tire. When the circular plate 40 is rotated in the opposite direction, the slide blocks move the shoes to a retracted position 20, as shown in FIG. 3, to release the green tire into a mold.

The circular plate 40 is affixed such as by a weld joint or brazing to a rotatable sleeve 42 that is journaled as at 44, 46 to a vertically extending pin 48. The top end of the pin 48 may include a mounting plate 50 or other suitable means for attaching the loader basket 10 to an elevator frame (not shown) used to vertically and horizontally move the loader basket 10 with respect to the lower mold of the tire press. The construction and operation of the elevator frame is well known and need not be described herein.

Axially spaced above the circular plate 40 is an adjusting plate 52 that is also fixedly attached to the sleeve 42 such as by a weld joint or brazing. In this configuration, when the adjusting plate 52 is rotated, the circular plate 40 rotates therewith. An adjustment handle 54 is similarly attached to the sleeve 42 so that the handle can be used to manually rotate the sleeve 42 and the attached adjustment and circular plates 40, 52.

An actuating plate 56 is journaled as at 58 to the pin 48 so that the actuating plate is free to rotate about the pin 48. The actuating plate 56 can be rotated clockwise and counterclockwise in an oscillatory manner by a piston cylinder assembly 60. The piston cylinder assembly 60 includes a push rod 62 that has a distal end which is pivotally connected as at 66 to an ear 64 of the actuating plate 56. The blind end of the piston cylinder assembly 60 is supported on stub bracket 68 secured to a support arm 70. The support arm 70 is fixedly mounted on the pin 48 by a bracket 72.

The push rod 62 is movable between a first or retracted position and a second or extended position (the retracted position is shown in the drawings). When the rod 62 is extended by operation of the piston cylinder, the actuating plate 56 rotates about the pin 48 in a counterclockwise direction (as viewed in FIG. 1). When the rod 62 is retracted, the actuating plate 56 rotates clockwise.

In accordance with an important aspect of the present invention, the actuating plate 56 can be fixedly connected or clamped to the adjustment plate 52 by means of a clamping mechanism 74 such that the actuating plate 56 and adjusting plate 52 rotate together in a predetermined relationship with each other when the push rod 62 is extended and retracted. The clamping mechanism 74 can also be operated to unclamp or disconnect the actuating plate 56 and adjusting plate 52, thus permitting the adjusting plate 52 to be freely rotated by operation of the adjustment handle 54.

As shown in FIG. 1, the actuating plate 56 includes a pair of arcuate slots 76, 78 that are radially spaced from each other. The clamping mechanism 74 in this case includes clamp members 80, 81 that extend through the arcuate slots 76, 78 respectively and are fixedly attached to the adjusting plate 52. The clamping members 80, 81 are manually actuated by respective clamp handles 74a and 74b, and are mounted on a clamp link 82 that is located above the actuating plate 56. When the clamp handles 74a and 74b are tightened by an operator, the actuating plate 56 is tightly clamped and sandwiched between the clamp link 82 and the adjusting plate 52, thus connecting the actuating plate and adjusting plate together for mutual rotation in response to movement of the push rod 62. When the clamp handles 74a, 74b are loosened, the arcuate slots 76, 78 allow the adjusting plate 52 to be rotated with respect to the actuating plate 56 by the operator turning the adjustment handle 54.

The clamping action of the mechanism 74 can be effected, for example, by a cam-type action that presses the link 82 against the actuating plate 56 and adjusting plate 52. Alternatively, the clamp handles can be of a threaded design so that when the handles are rotated, the clamp link, actuating plate and adjusting plate are drawn together.

The arcuate slots 76, 78 thus allow the adjusting plate 52 to be rotated by means of the adjusting handle 54 within a range of angular offset positions relative to the actuating plate 56, when the actuating plate 56 and adjusting plate 52 are not clamped together. The range of angular offset positions between the plates 52, 56 is defined by the arc lengths of the arcuate slots 76, 78, which lengths can be selected as a function of the various tire diameters that will 4 be picked up by the tire loader shoes 20.

The tire loader basket assembly also preferably has a tire proximity switch assembly 90 which is engaged by the tire carcass when it is loaded onto the shoes 20. The switch assembly 90 is 8 connected to the control system of the tire press. The operation of the tire proximity switch assembly 90 is well known in the art and need not be explained here further.

OPERATION

In use of the tire loader basket 10, an operator can easily adjust the radial extension of the loader shoes 20 by first unclamping the adjusting plate 52 from the actuating plate 56 by loosening the clamp handles 74a, 74b. After the plates are released from each other, the operator uses the adjustment handle 54 to rotate the adjusting plate 52, which rotation correspondingly moves the shoes 20 via the connecting links 36 and slide blocks 18, to position the shoes 20 to their extended position to engage a tire bead (as a function of the radius of tires to be picked up). The push rod 62 is then fully extended (if full stroke operation of the piston cylinder is to be used), after which the clamp handles 74a, 74b are tightened to clamp the actuating plate 56 to the adjusting plate 52. In this manner, the adjusted extended position of the shoes 20 corresponds to the full extension of the push rod 62. Thereafter, operation of the piston cylinder 60 causes rotation of the clamped plates 52, 56 thereby causing the shoes 20 to move between their extended and retracted positions.

The adjusting plate 52 can thus be selectively positioned in a fixed relationship with respect to the actuating plate 56 in any of a range of positions as the clamp members 80, 81 move within the slots 76, 78. The selected fixed position of the adjusting plate 52 with respect to the actuating plate 56 determines the location of the resultant extended and retracted positions of the loader shoes 20 as the piston cylinder 60 is actuated. The extended position of the loader shoes 20 can thus be selected between the position 20' shown in FIG. 2 and the position 20" shown in FIG. 2, with the extended position 20' being achieved when the the clamp members 80, 81 are at one extreme end of the actuate slots 76, 78, and the extended position 20" being achieved when the clamp members 80, 81 are at the other extreme end of the actuate slots 76,78.

The invention thus provides a loader shoe adjustment mechanism by which, the extended position of the shoes 20 can be directly and accurately set by the operator to pick up the green tires without applying excessive pressure to the tire bead, and without the operator having to rely on calibration marks or other indirect estimation of the shoe extended position. The adjusting mechanism can easily be actuated by simply loosening the clamp handles and the adjustment handle to set the shoes' extended position.

While the invention has been shown and described with respect to specific embodiments thereof, this is for the purpose of illustration rather than limitation, and other variations and modifications of the specific embodiments herein shown and described will be apparent to those skilled in the art within the intended spirit and scope of the invention as set forth in the appended claims.

What is claimed is:

1. A tire loader basket assembly for a tire press, comprising:
   a frame;
   a plurality of loader shoes mounted for radial movement on the frame;
   an adjusting plate mounted for rotation with respect to the frame and connected to each of the shoes by a respective link such that rotation of the adjusting plate causes radial movement of the shoes;
   an actuating plate mounted for rotation with respect to the frame by operation of an actuating means connected to the actuating plate; and
   means for releasably connecting the adjusting and actuating plates together so that when the plates are connected, they rotate together by operation of the actuating means, and when the plates are unconnected, the adjusting plate can be rotated to set a movement limit for the shoes.

2. The loader basket assembly of claim 1 wherein the shoes can move radially between extended and retracted positions when the actuating plate rotates between first and second positions and is connected to the adjusting plate.

3. The loader basket assembly of claim 2 wherein said connecting means comprises a clamping mechanism for clamping the actuating plate and adjusting plate together within a range of angular offset positions with respect to each other.

4. The loader basket assembly of claim 3 wherein the clamping mechanism comprises a pair of clamp members that each have a clamp and unclamp position, said clamp members being operable in said clamp position to clamp the actuating plate between a clamping link and the adjusting plate,, the adjusting plate being rotatable with respect to the actuating plate when said clamp members are in their unclamp position.

5. The loader basket assembly of claim 4 wherein the actuating plate includes a pair of arcuate slots that cooperate with the clamp members to permit the adjusting plate and actuating plate to be clamped together with a relative angular offset therebetween.

6. The loader basket assembly of claim 4 wherein the adjusting plate can be rotated by means of a handle attached to the adjusting plate.

7. The loader basket assembly of claim 2 wherein said actuating means comprises a piston cylinder that operates between an extended position and a retracted position that correspond respectively to said actuating plate first and second rotational positions.

8. The loader basket assembly of claim 7 wherein the loader shoes move radially to an extended position when the piston is extended, and to a retracted position when the piston is retracted, whereby tires held by the shoes can be loaded into respective molds of the tire press and the shoes retracted therefrom by operation of the piston cylinder.

9. The loader basket assembly of claim 8 wherein the extended position of the shoes can be adjusted using an adjustment handle when the adjusting plate and actuating plate are unconnected.

10. The loader basket assembly of claim 9 wherein the adjusting plate is connected to the links by a third plate fixedly attached to a rotatable sleeve to which the adjusting plate is also fixedly attached, said links being connected to said third plate whereby rotation of the third plate by operation of the piston cylinder causes the shoes to move between their extended and retracted positions.

11. The loader basket assembly of claim 10 wherein said adjustment handle is fixedly attached to said sleeve.

12. The loader basket assembly of claim 11 wherein said sleeve is journaled on a pin that can be attached to a mechanism for vertical and horizontal movement of the loader with respect to the tire press.

13. A tire loader basket assembly for a tire press comprising: a circular frame; a plurality of loader shoes each mounted on the frame for radial movement between an extended position and a retracted position; an actuation plate rotatable between first and second positions that correspond to said shoe extended and retracted positions; and an adjustment plate interconnected to each of said shoes and that can be connected for rotation with the actuation plate to cause said Shoe radial movement, and that when unconnected from the actuation plate can be rotated to determine said extended positions of the shoes.

14. The tire loader basket assembly of claim 13 further comprising clamping means for clamping ,said actuation and adjustment plates together to permit said plates to rotate together, and for unclamping said plates to permit rotation of said adjustment plate relative to said actuation plate.

15. The tire loader basket assembly of claim 14 wherein said clamping means comprises a pair of clamping devices operable in locked and unlocked conditions; and means for adjusting an angular offset between said actuation and adjustment plates when said clamping devices are unlocked such that said angular offset corresponds to a selected extended position of said shoes.

16. The tire loader basket assembly of claim 15 wherein said adjusting means comprises a pair of arcuate slots in said actuation plate that cooperate with said clamping devices to define a range of angular offset positions between said actuation and adjustment plates for adjusting extended positions of said shoes.

17. The tire loader basket assembly of claim 13 further comprising manually operable clamping mechanisms for: 1) clamping said actuation and adjustment plates together for mutual rotation between first and second positions that correspond to said shoe extended and retracted positions; and 2) unclamping said actuation and adjustment plates so that said adjustment plate can be rotated with respect to said actuation plate to determine corresponding extended positions for said shoes.

18. The tire loader basket assembly of claim 13 wherein said shoes are interconnected to said adjustment plate by links, with each link attached at a first end to a respective shoe and at a second end to a third plate that rotates with said adjustment plate.

19. The tire loader basket assembly of claim 18 wherein said third plate and adjustment plate are mounted on a rotatable sleeve that can be manually rotated when said adjustment plate and actuation plate are unconnected from each other.

20. The tire loader basket assembly of claim 13 further comprising a rod connected at one end to said actuation plate and at the other end to an actuation means .for moving said rod between first and second rod positions that correspond to said actuation plate first and second positions.

21. The tire loader basket assembly of claim 20 wherein said shoes are moved radially between said extended and retracted positions as said rod is moved between said first and second rod positions when said actuation and adjustment plates are connected together.

22. The tire loader basket assembly of claim 21 wherein said actuation means comprises a fluid piston cylinder.

* * * * *

UNITED STATES PATENT AND TRADEMARK OFFICE
CERTIFICATE OF CORRECTION

PATENT NO. : 5,395,150
DATED : March 7, 1995
INVENTOR(S) : Donald C. Imler et al It is certified that error appears in the above-identified that said Letters Patent is hereby corrected as shown below:

Col. 1, line 22, "are-then" should be --are then--.
Col. 2, line 14, after "user" insert --to--.
Col. 2, line 58, "the:" should be --the--.

Col. 4, line 67, after "will" delete --4--.
Col. 5, line 4, after "is" delete --8--.
Col. 7, line 13, "Shoe" should be --shoe--.
Col. 7, line 18, after "clamping" delete --,--.
Col. 8, line 24, ".for" should be --for--.

Signed and Sealed this

Twentieth Day of June, 1995

BRUCE LEHMAN

Attest:

Attesting Officer

Commissioner of Patents and Trademarks